Oct. 3, 1961     L. M. BROWNING, JR., ET AL     3,002,805
METHOD FOR CONTACTING FLUIDS WITH SOLID CONTACT MATERIALS
Filed March 7, 1957     5 Sheets-Sheet 1

INVENTORS
Lewis M. Browning, Jr.
Raymond R. Halik
John A. Crowley
ATTORNEY

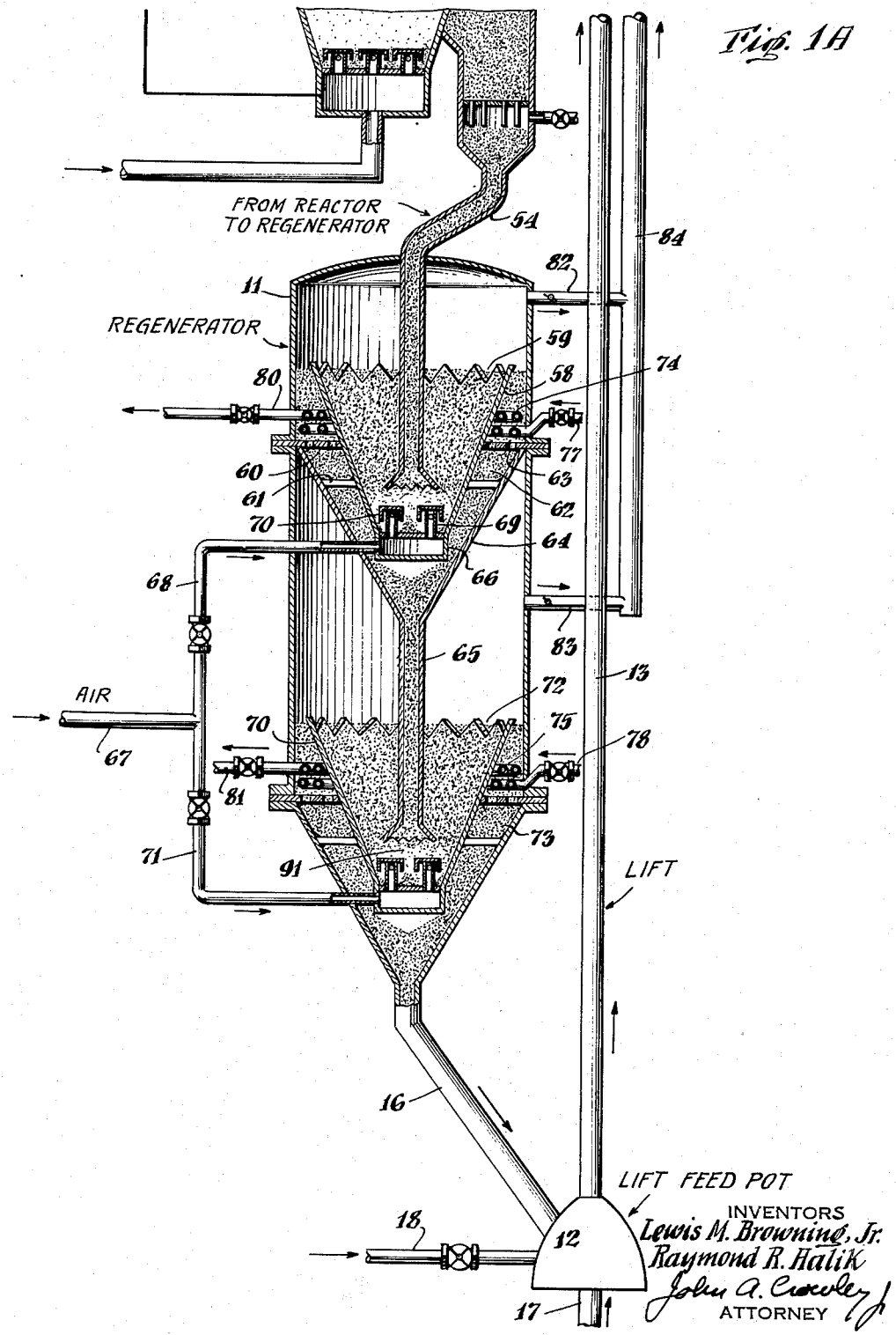

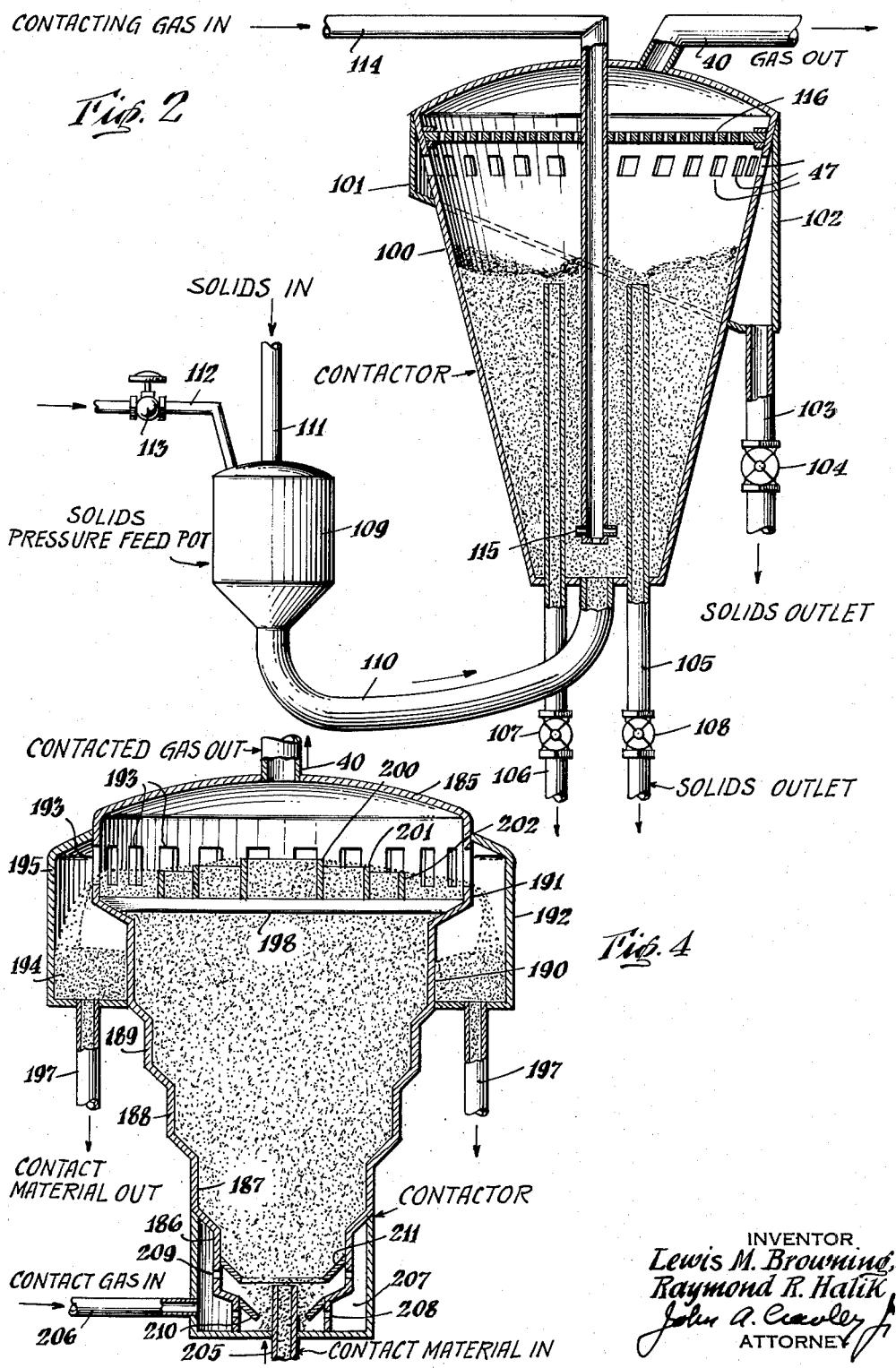

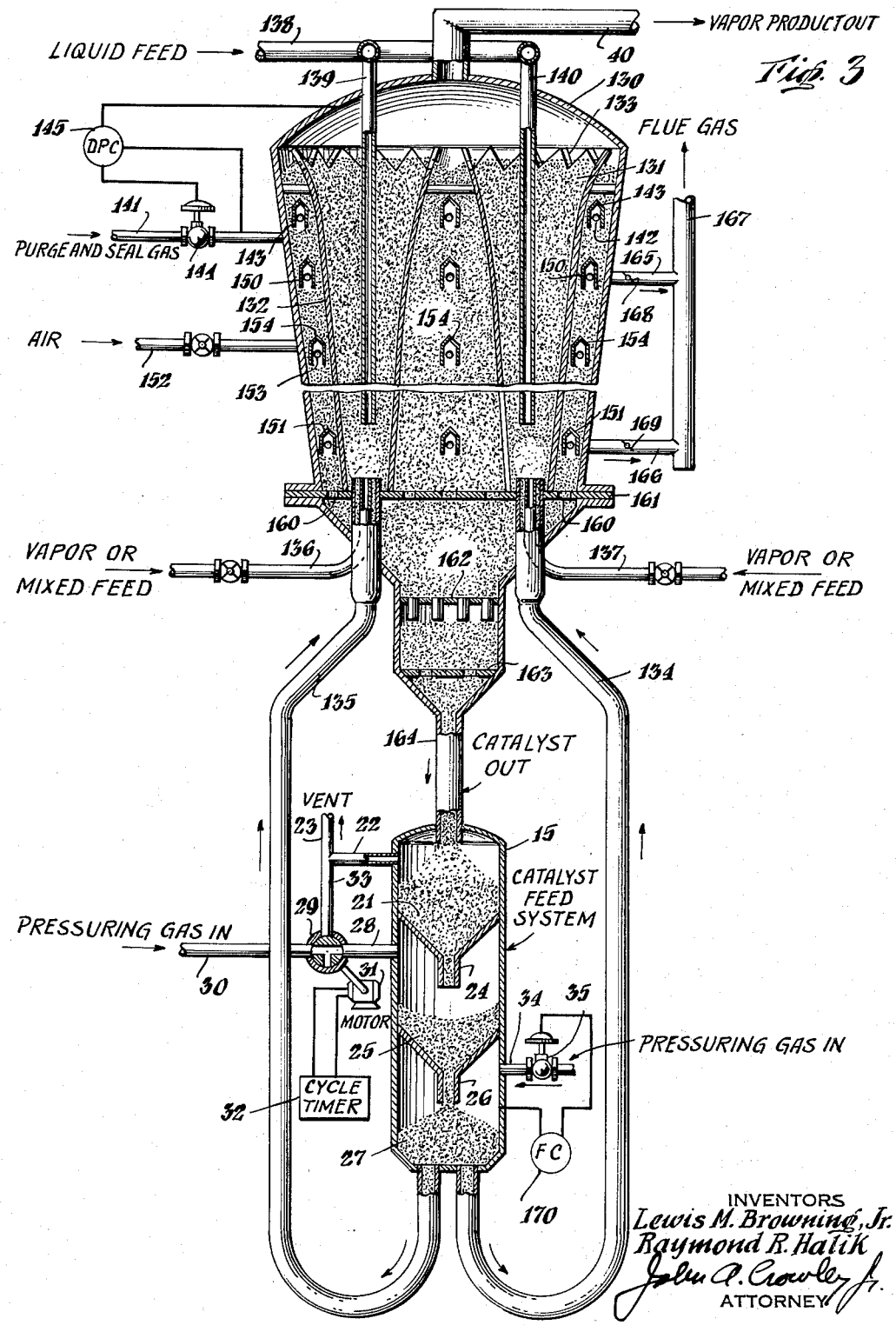

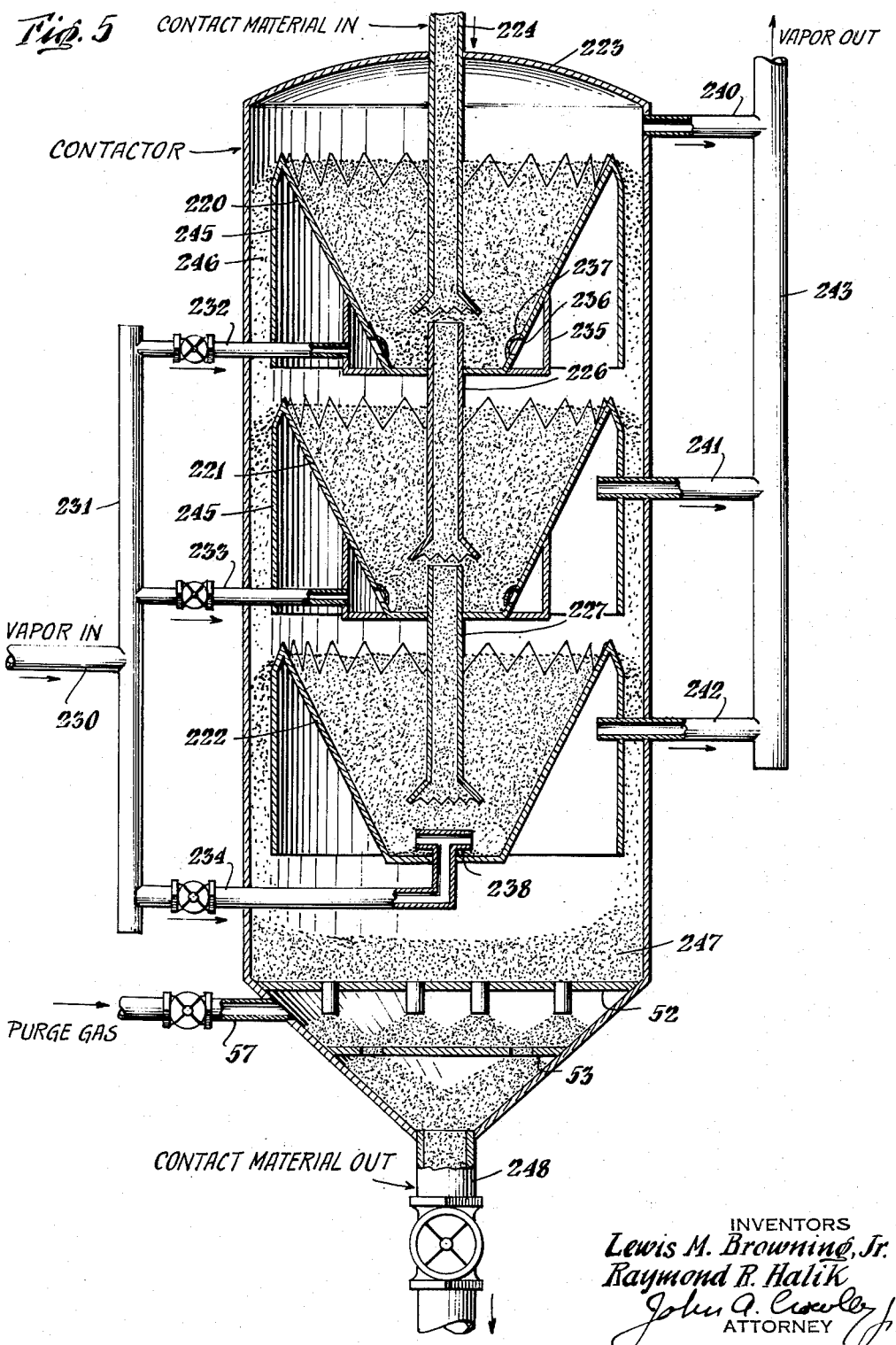

3,002,805
METHOD FOR CONTACTING FLUIDS WITH SOLID CONTACT MATERIALS

Lewis M. Browning, Jr., Wenonah, and Raymond R. Halik, Pitman, N.J., assignors to Socony Mobil Oil Company, Inc., a corporation of New York
Filed Mar. 7, 1957, Ser. No. 644,618
15 Claims. (Cl. 23—1)

This invention deals with a method for contacting fluids with solid contact materials of palpable particulate form. It is particularly concerned with a continuous method for bringing together fluids existing at least partially in the gaseous phase under the conditions of contacting and solid materials, effecting their contacting and separating them after the contacting.

The invention is applicable to operations and processes involving the continuous contacting of gas containing fluids and particle form solids for any of a wide variety of purposes. Examples are gas-solid heat exchange, gas dehydration, drying or heat treating of solids, separation of fluids by adsorption and clay and catalyst regeneration by burning. It is also applicable to processes involving pyrolytic conversion of hydrocarbons such as thermal cracking, viscosity breaking, coking, gas manufacture, ethylene and acetylene manufacture, etc. It is particularly applicable to catalytic conversion processes such as cracking, reforming, dehydrogenation, hydrogenation, hydrocracking, hydro-finishing, desulfurization, isomerization, polymerization and cyclizing. The method is inherently useful in the transport of solids from one level to a higher level in conjunction with the gas-solid contacting operation.

The contact material involved may vary widely, depending upon the particular contacting operation involved. For example, in drying operations it may take the form of clay materials or granules of grain. For gas dehydration and adsorption operations, it may be comprised of particles of silica gel or charcoal. For high temperature pyrolytic conversions, it may take the form of any of a number of refractory materials such as fused alumina, mullite, Carborundum or zirconium oxide. For coking processes, the contact material may take the form of a low activity clay catalyst, petroleum coke, pumice or similar materials. For catalytic hydrocarbon conversions, the catalyst may take the form of treated clays, bauxites, inert or active carriers impregnated with certain catalytically active metals or compounds thereof or synthetic associations of silica, alumina, magnesia, chromia, molybdenum oxide, etc., or combinations thereof, to which may be added small amounts of other metals or compounds such as platinum for specific purposes. The contact material may be in the form of pellets, spheres, tablets, pills or irregular shaped granules of palpable particulate form, as distinguished from powdered material. It should be understood that the term palpable particulate form, as used herein, is intended, unless otherwise specified, to cover any of these shapes of particles and to distinguish from powdered material substantially smaller than 100 mesh Tyler in average diameter. The contact material involved in this invention should, in general, be made up of particles having average diameters within the range about 0.0058 to 0.5 inch and preferably within the range 0.03 to 0.5 inch. As will be discussed hereinafter, rounded or spherical particles are preferred. The density of the material as poured into a measuring container without packing may vary widely, depending on the process, from about 20 to 130 pounds per cubic foot, and, in the case of materials for catalytic conversions, preferably may range from about 25 to 60 pounds per cubic foot.

In the past, continuous systems for contacting fluids with contact materials of the size range here involved have involved gravity flow of the solids as a compact bed through the contacting zone or zones. The contacted solids are withdrawn from the bottom of a contacting zone and lifted by mechanical or pneumatic means in an outside conveyor system to a level from which it may again flow through the contacting zone or through a second contacting zone. Aside from the fact that outside conveyors or lifts are required in such systems, they are inherently limited to relatively low space velocity operation in the contactors due to limitations in the amount of vapor which can be disengaged from the contact material in the space available within the contactor. Thus, for example, in commercial catalytic cracking processes of this type, space velocities over about four volumes of oil charge measured as a liquid at 60° F. per volume of catalyst in the reaction zone are rarely used. Usually, the space velocity is of the order of one to three. When the reactant is passed upwardly through the bed of catalyst in the reactor, its velocity is limited below that which would cause a bed-disrupting pressure drop, i.e., a pressure drop in excess of the gravity head of the catalyst in the bed. Down flow of vapors has been employed to permit higher vapor velocities, but this requires the devotion of a considerable amount of reactor and catalyst volume to the gas-solid disengaging internals. In processes employing powdered catalysts, higher space velocity operation has been practiced by maintaining the catalyst bed in fluidized condition. In these processes, the vapor flows upwardly through the bed of powdered catalyst, and the catalyst may move either up through or down through the contacting zone. But, in these processes, a very considerable amount of contactor space must be devoted to vapor-solid disengagement. Moreover, since in fluidized beds the powdered solids tend to migrate haphazardly in all directions within the bed, it is difficult to precisely control the residence time of any individual particle of catalyst with the contacting vapor. Operations have been proposed in which powdered solids are carried in relatively dilute suspension in the contacting gas straight through the contacting zones, but the velocity of solids flow through the contactor is high, and it is difficult to maintain a high concentration of solids available for contacting in the contacting zone in such processes. As a result, contacting zones of excessive length and volume are required to effect the desired contacting.

It has been proposed to force granular contact materials upwardly through contacting zones as compact beds by means of mechanical means. Such proposals have not avoided the space velocity limitations of gravity flow operations and involve the usual disadvantages and failure of mechanically moving equipment, particularly when the process involves high temperature operations. Moreover, the catalyst is subjected to stress conditions nurturing excessive attrition and breakage of the contact material particles.

Pneumatic transfer systems, as opposed to contacting or conversion operations, have been proposed for conveying granular solids in compacted condition. Such systems invariably involve imposition of a gaseous pressure onto a bed of the solids so as to create a flow of gas downward through the bed and then up into a communicating lift pipe of small cross-section relative to the bed so as to push or carry the solids along with the gas flow up through the lift pipe. In such systems, all of the gas which effects the lifting and which passes through the lift pipe enters by way of the lift feed bed and through the restricted passageway communicating the feed bed with the lift pipe. As a result of this and further because of the restricted diameter of the lift, the pressure drop is very high and the amount of gas flow is low. Such arrangements are not suitable, therefore, for high space velocity contacting operations.

A major object of this invention is the provision of a method for contacting fluids which exist partially in the gaseous phase under contacting conditions with solid contact materials of palpable particulate form, which method overcomes the disadvantages of the above-mentioned methods for conducting continuous gas-solid contacting operations.

Another major object is the provision of an improved method for continuously contacting fluids which exist at least partially in the gaseous phase with contact materials of palpable particulate form.

A specific object is the provision of a continuous method for converting fluid reactants which exist at least partially in the gaseous phase under the conversion conditions with solid contact materials of palpable particulate form, which method is adopted for high, as well as low, space velocity operations.

These and other objects of the invention will become apparent from the following descriptions.

In a preferred form, this invention involves a method in which a bed of contact material of palpable particulate form is maintained in an upwardly extending contacting zone. Contact material is introduced into the lower section of the contacting zone with a force insufficient to convey the contact material through the zone. A contacting fluid, which either is or will be vaporized at least in part in the contacting zone, is introduced separately of the contact material into the lower section thereof to mix with the contact material. The fluid or the gaseous portion thereof is passed upwardly through the bed of contact material at a rate sufficient to force the contact material in the bed to move upwardly through the contacting zone. The bed is gradually expanded laterally so that its horizontal cross-sectional area progressively increases at successively higher levels until near the surface of the bed the velocity of gas flow has been reduced below the boiling velocity, whereby the bed is maintained in compacted condition substantially throughout its length. The contacted gas is withdrawn upwardly from the upper section of the bed, and the contact material is separately withdrawn near the upper section of the bed. In accordance with the broader aspects of this invention, the direction of upward movement of the contact material through the contacting zone may have a lateral, as well as a vertical, component, and the terms "upward movement," "upward transfer" and the like are used herein in a sense sufficiently broad to cover this, unless otherwise specified.

The invention may be most readily understood by reference to the attached drawings, of which FIGURE 1 is an elevational view, partially in section, showing the upper portion of one preferred arrangement and application of the invention. FIGURE 1A is a similar view of the lower portion of said preferred arrangement.

FIGURE 2 is an elevational view, partially in section, showing a modified arrangement of the invention, particularly with respect the method for introduction and withdrawal of contact material to and from the contacting zone.

FIGURE 3 is an elevational view, partially in section, of another modified arrangement and application of the invention, taking advantage of the inherent catalyst lift.

FIGURE 4 is an elevational view, partially in section, of still another arrangement for the contacting method of this invention.

FIGURE 5 is an elevational view, partially in section, of a modified multi-stage arrangement of the invention.

Figure 1:
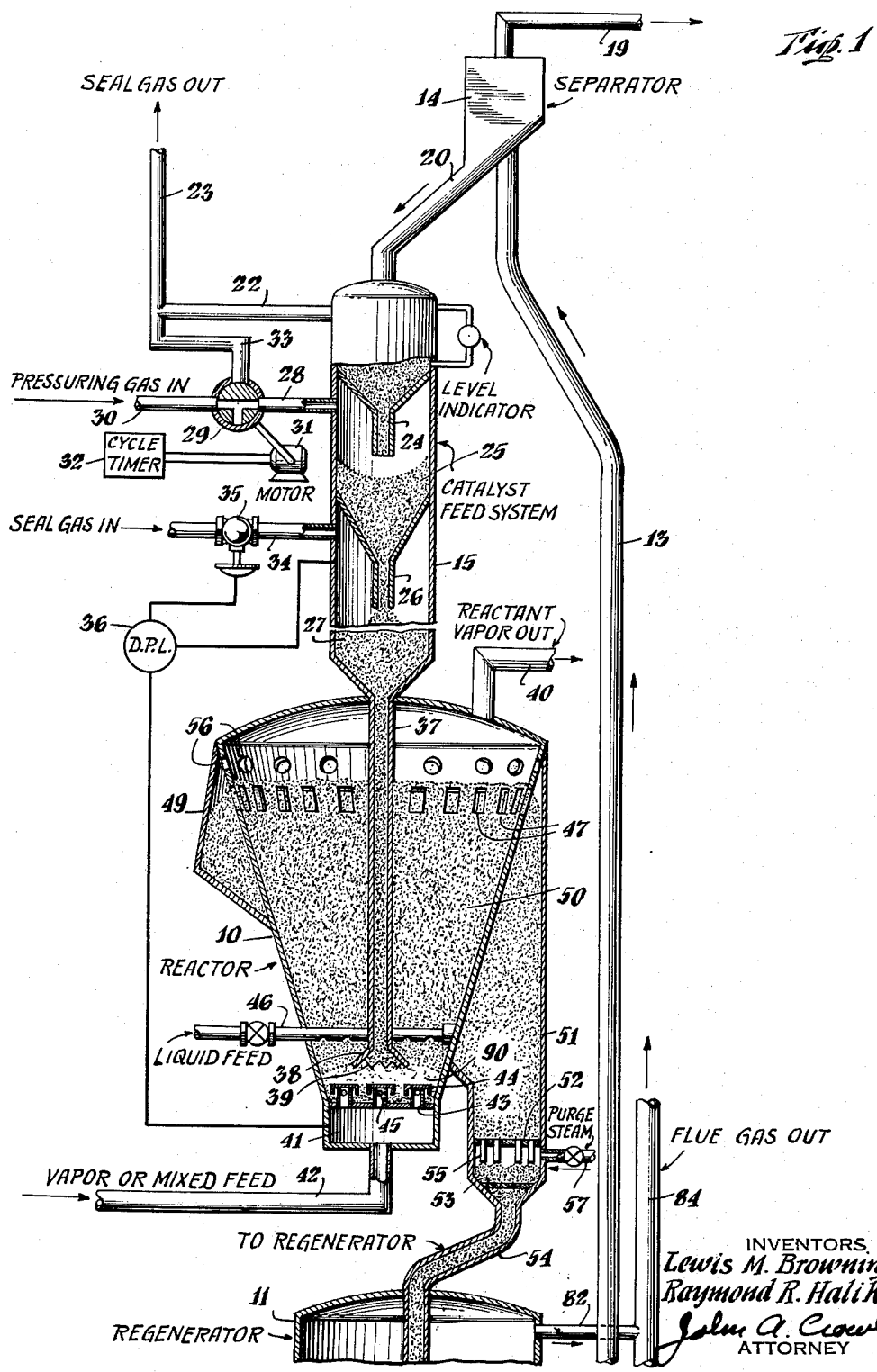

Turning now to FIGURES 1 and 1A together, there is shown a typical application of this invention in a continuous catalytic cracking process. The catalyst may be in the form of a silica alumina bead gel catalyst of approximately 4 to 20 mesh Tyler size range. This catalyst may be prepared in the manner disclosed in U.S. Patent Number 2,384,946. It will be understood, of course, that other types of cracking catalysts, such as natural super-Filtrol clay catalysts, might be employed. In FIGURES 1 and 1A, there are shown a reactor 10, a regenerator 11, a lift feed pot, lift conduit and lift separator 12, 13 and 14, respectively, and a catalyst feed system 15. Regenerated bead cracking catalyst passes from the regenerator 11 via conduit 16 to the left feed pot 12, from which it is lifted by means of a suitable lift gas entering via pipe 17 or pipe 18 or both up through the lift conduit 13 to the separator 14. The lift systems may involve transfer of the catalyst either in compacted condition or in relatively dilute suspension in the lift gas. Designs for and operation of such systems are now well known in the art. The lift gas may be air, flue gas, steam, hydrocarbon vapor, etc. The lift gas is separated from the catalyst in the separator and withdrawn from the top of the separator via conduit 19. The catalyst settles to the bottom of the separator and flows by gravity through conduit 20 into the surge chamber portion 21 of the catalyst feed system 15.

The surge chamber 21 is vented to the atmosphere via ducts 22 and 23. Catalyst drops from chamber 21 via conduit 24 into the pressuring chamber 25. Before the catalyst level in chamber 21 drops below a point shortly above the upper end of its conical draw-off section, the pressure in chamber 25 is increased to a level equal to or slightly above that in feed chamber 27 by means of a suitable pressuring gas supplied from conduit 30 via three-way valve 29 and conduit 28. This automatically stops the flow of catalyst in conduit 24, and the leg of catalyst in conduit 24 acts as a seal against excessive loss of seal gas through chamber 21. The catalyst leg 24 and the catalyst bed in chamber 21 are so dimensioned that the amount of pressuring gas escaping up through leg 24 is insufficient to promote disruption of the bed in chamber 21, whereby the catalyst is maintained in compacted condition within the leg 24. It is usually preferred to employ an inert pressuring gas such as steam or flue gas when the system is employed in conjunction with a hydrocarbon conversion reactor, but, if hydrocarbon gas is employed in the lift 13 and the vent 23 does not open directly to the atmosphere, normally gaseous hydrocarbons may be employed as pressuring gas for chamber 25. Where the feed system is employed for supplying catalyst into a contacting vessel other than a hydrocarbon reactor, other suitable compatible pressuring gases may be employed.

When the pressure in chamber 25 has reached that in chamber 27, catalyst flows via pipe 26 into chamber 27. Before the catalyst level in chamber 25 has dropped below the upper end of its conical draw-off section, the cycle timer 32 actuates motor 31 to change the setting of valve 29, so that the pressuring gas is shut off and chamber 25 is vented through conduit 33 and duct 23 to a region of lower pressure. The pressure in chamber 25 drops to that in chamber 21, which is also vented to the low pressure region via conduit 22, the catalyst flow to chamber 27 stops, the leg 26 and the remaining bed in chamber 25 act as a compact seal against excessive gas loss from chamber 27 in a manner similar to leg 24 and bed 21, as above described, and catalyst again flows from chamber 21 to chamber 25 via leg 24. A suitable seal gas is continuously admitted to chamber 27 via conduit 34 at a rate controlled by the diaphragm-operated valve 35 and differential pressure controller 36 to maintain the gaseous pressure in chamber 27 slightly above, i.e., ¼ to 1 pound per square inch, that in the lower section of reactor 10. The pressure in the lower section of the reactor would depend on the reactor's size and capacity. In a commercial gas oil cracker, this may be of the order of 25 to 75 pounds per square inch, for example, while that at the reactor bed surface is about 10 pounds per square inch. As an example, in a reactor for catalytic cracking of 15,000 barrels per day of petroleum gas oil, over a 4 to 20 mesh silica alumina bead catalyst, in a bed having sides tapering out at about 30 degrees with the vertical, the bed diameter is 18 feet at the top and 6 feet at the bottom, and the total pressure drop due to vapor flow through the bed may be about 25 pounds per square inch. Catalyst, which may be at a temperature of about 975° F., for example, flows as a substantially compact column through conduit 37 into the lower section of the reactor 10. The construction and operation of the catalyst feed system 15 is the subject matter of claims in United States applications Serial Numbers 344,576, 624,455 and 390,468, filed in the United States Patent Office on March 25, 1953, November 26, 1956, and November 6, 1953, now Pat. Nos. 2,854,155, 2,854,157, 2,851,401 respectively. A conical delivery section 38, serrated along its lower edge is connected to the lower end of conduit 37. While this section is not essential, it has been found that it provides more uniform catalyst distribution into the reactor over a wider area and that the serrations 39 insure more even feeding of the catalyst.

The reactor 10 is of frusto-conical or funnel shape, having a vapor product outlet 40 at its top and a vapor inlet distribution chamber 41 at its lower end. A reactant vapor feed conduit 42 connects into the bottom of chamber 41, and several vapor riser tubes 43 connect through the top of chamber 41. These tubes terminate in reactor 10 shortly below the level of catalyst inlet funnel 38, and their upper ends are closed off by and serve to support inverted vapor distributor caps 44. Vapor issues from the tubes 43 via orifices 45 located below the caps 44 and is distributed by the caps into the catalyst mass. The tubes 43 are preferably uniformly spaced and distributed over the cross-section of the lower section of the reactor. The vapors entering from conduit 42 may consist of a petroleum gas oil boiling in the range 450 to 900° F. and entering at about 900° F., for example. A number of uniformly spaced, perforated liquid feed pipes, of which one may be seen at 46, are positioned across the lower section of the reactor to permit separate supply of liquid hydrocarbon feed, if desired. This liquid may comprise a heavy gas oil or deasphalted residuum fraction. A number of rectangular slot openings or weirs 47 are spaced around the periphery of an upper portion of the vessel at a level sufficiently below its top to permit effective disengagement of the gasoline containing vapor products from the catalyst bed and withdrawal via conduit 40 without serious catalyst entrainment. Usually, it is preferred to locate the weir slots 47 two or more feet below the top of the reactor 10.

A jacketed section 49 is provided around the reactor 10 to receive catalyst flowing from the upper section of the bed 50 through the weir slots 47. The bottom of the jacketed section slopes downwardly, and the side walls are so shaped as to provide along one side of the reactor a communicating vertical catalyst purge and drain chamber 51, which is of cylindrical cross-section along its lower section. Partitions 52 and 53, with suitably arranged down-pipes, are provided in the lower section of section 51 to promote uniform flow of catalyst therethrough to the catalyst withdrawal conduit 54. A suitable purge gas, such as steam or flue gas, is introduced via conduit 57 below partition 52 so that it may pass up through the down-pipes 55 and through the bed of spent catalyst in section 51, thereby purging hydrocarbon vapors from the spent catalyst. The purge gas passes upwardly through slots 47 and by-pass openings 56 into the upper section of the reactor to be withdrawn along with vapor reaction products via conduit 40. The drain section and purge gas distribution arrangement is the subject matter of claims in United States Patent Number 2,434,202.

Spent catalyst bearing a carbonaceous contaminant deposit, and existing at 950° F., for example, flows as a compact column through conduit 54 into the lower section of the first stage 58 of the regenerator 11. The pressure in the lower section of stage 58 may be of the order of 10 pounds per square inch, that at the top of stage 58 being about atmospheric. Stage 58 is of frusto-conical shape and open on its upper end. Weir notches 59 are provided along the upper edge of the stage side walls. Stage 58 is of smaller diameter than the regenerator shell 11 and is supported within the shell by partition 60 and brackets 61. A passage 62 is thereby provided between stage 58 and shell 11 for flow of catalyst passing through notches 59 down through openings 63 in partition 60. A funnel member 64 is suspended from partition 60 to provide further passage for the catalyst to the gravity feed conduit 65. Catalyst flows as a compact gravitating column through conduit 65 into the lower section of the second regeneration stage 70, which is similar in construction and arrangement to stage 58. The pressure in the lower section of stage 70 may be of the order of 10 pounds per square inch, and the length of the gravity feed column from which catalyst is delivered into stage 70 should be sufficient to insure catalyst flow against this pressure. An air distribution chamber 66 is provided at the lower end of stage 58, and air is supplied to this chamber from conduit 67 via conduit 68. Air is distributed into the lower section of stage 58 via orifice-containing tubes 69 and caps 70 in a manner similar to the hydrocarbon distribution system described for the reactor. A similar distribution system supplied via conduit 71 is provided at the lower end of stage 70. Regenerated catalyst flows from the upper section of the bed in stage 70 through V-shaped weir notches 72 and down through passageway 73 to the outlet conduit 16. Cooling coils 74 and 75 are provided within the passageways 62 and 73, respectively. These coils are supplied with cooling water under pressure via connections 77 and 78 for the purpose of reducing the catalyst temperature between stages and adjusting the regenerated catalyst temperature to a level suitable for its return to the reactor. Steam and excess cooling water are withdrawn from the coils via outlets 80 and 81. By way of example, the catalyst may enter stage 58 at 850° F., flow from stage 58 at 1,200° F., be cooled by coils 74 to 900° F., leave stage 70 at 1,200° F., and be cooled again by coils 75 to 1,000° F. before return to the reactor. Further removal of regeneration heat may be effected by supplying the air to the regeneration stages at temperatures below the regeneration temperature and, if desired, cooling coils may be provided within the regeneration stages. It will be understood that more than two regeneration stages may be employed where the coke load and maximum temperature limitations make this desirable. Cooling fluids, such as molten metals and eutectic mixtures of inorganic salts, may be employed in place of water in the cooling coils. Flue gas disengages upwardly from the catalyst bed surface in stages 58 and 70 and is withdrawn separately from the stages via conduits 82 and 83, which connect into flue gas stack 84.

The regenerated catalyst flows as a compact column via conduit 16 onto a bed of catalyst in the lift feed pot 12, from which it is lifted by the lift gas into and through the lift conduit 13.

It will be noted that, in accordance with this invention, the contacting zones are of progressively larger horizontal cross-sectional area at successively higher levels. This may be accomplished preferably by providing chambers of generally frusto-conical shape as shown in FIGURE 1 or having side walls which spiral outwardly as shown in FIGURE 3, to be discussed hereinafter. However, within the broader scope of this invention, it is envisaged that the contacting zone may be of generally trough shape having only two sides sloping outwardly. In this latter form, the direction of solids flow may be lateral from one non-tapered end to the other, as well as upward through the zone. In less preferred forms, the contacting zone may be housed by a series of cylindrical shells of differing diameter arranged so as to, in effect, provide a zone of progressively larger cross-section at successively higher levels. Such an arrangement is shown in FIGURE 4 to be discussed hereinafter. It will be understood that, unless otherwise specifically restricted, the language of progressively greater horizontal cross-sectional area at successively higher levels as used herein in describing and claiming this invention is employed in a sense sufficiently broad to include any of the above-mentioned shapes and forms of the contacting zone. The purpose of this design is to permit attainment throughout the greater portion of the catalyst bed depth of sufficiently high gas velocities to effect upward transfer of the catalyst through the contacting zone, while, at the same time, providing at the bed surface sufficient cross-sectional area to cause a reduction in the gas velocity below that which would cause disruption or boiling of the bed near its surface. This, in turn, insures maintenance of the entire bed of upwardly moving catalyst in compacted condition.

In general, in order to effect upward transfer of the catalyst in compacted condition through the contacting zone, the velocity should be sufficient to provide a conveyance force measured as pressure drop in pounds per square foot through most of the bed depth in excess of the gravity head of the compacted contact material through the same bed depth. By gravity head is meant the weight per named unit of cross-section and bed height of the catalyst as measured in the compacted state in which it exists in the bed. Reduced to an area of one square foot and height of one foot, this becomes the bulk density of the catalyst in its compact bed state. Usually, to effect transfer, the required minimum pressure drop due to gas flow should be greater than the gravity head. In normal operations, overall pressure drop through the bed may range from about 1 to 10 pounds per square inch per average foot of flow. The pressure drop is greatest in the lower, smaller diameter section, and least near the top. In order to prevent boiling of the catalyst bed near its surface, i.e., disruption of its compacted condition in which each particle rests on and is supported by particles therebelow and surrounding particles, the velocity of gas flow must be reduced as it approaches the bed surface so that the pressure per increment of upward flow through the portion immediately adjacent the bed surface is below the gravity head of the compacted catalyst in the same increment of flow. In other words, the pressure drop due to gas flow at and slightly below the bed surface in pounds per square foot should not exceed the density of the compacted catalyst in the bed in the same units. It is preferred to control the pressure drop due to gas flow at the bed surface not over about 90% of the catalyst gravity head, i.e., of the bed boiling pressure drop. In a bed of gradually expanding cross-section, this insures provision above the level in the bed where the gas velocity is just reduced to the boiling velocity of a covering layer of catalyst in which the gas velocity is below the bed boiling rate. This covering layer, therefore, possesses a residual gravity component which is exerted as a downward force on the portion of the bed therebelow, insuring its compactness. It is not here inferred that a column of granular catalyst will exert an accumulative hydrostatic head which can be measured at the bottom of the column as in the case of a fluid or as in the case of fluidized powders. However, when the gas velocity is below the bed boiling level near the bed surface, the corresponding layer of catalyst will exert a downward force on the portion of the bed immediately therebelow. This force, taken together with other restraining forces, i.e., the frictional forces from the wall, will insure compactness of the entire bed. The covering layer, in which the gas velocity is below the boiling velocity, may range in depth from 5 to 20% of the total bed height.

It has been found that the above objectives may be attained when the bed tapers outwardly at successively higher levels at least along two opposite upwardly extending boundaries in such a way that tangents drawn to said boundaries can be projected to intersect at an included angle or at included angles within the range of about 20 to 100 degrees. In the case of zones constructed as shown in FIGURE 4, the tangents referred to may be drawn along the outer edges of the bottoms of adjacent cylindrical sections. In any case, the included angle between downward projections of the side walls should fall in the range 20 to 100 degrees and preferably 30 to 60 degrees. It will be understood that, in vessels of the shape such as shown in FIGURE 3, tangents drawn at different levels along the side walls may intersect at differing angles within the above-mentioned ranges. It is, of course, permissible to provide vertical side walls along the upper portion of the contacting zone above the level where the cross-section has increased sufficiently to reduce the gas flow below the bed boiling velocity.

The catalyst may be introduced into the contacting zone in any of a number of ways, as will become apparent from discussion of the several attached figures. It may be introduced downwardly, as shown in FIGURE 1, or upwardly, as shown in FIGURE 2, or it may enter the contacting zone in any other direction. It should be supplied with a force sufficient to effect its introduction into the zone against the gaseous pressure therein, but with a force insufficient to effect transfer of the catalyst through the contacting zone. By separate supply of the force required to convey the catalyst through the contacting zone, the high pressure drops and power expenditure through the restricted catalyst entrance section and troublesome mechanical arrangements are avoided. In some instances, where the pressure in the contacting zone is relatively low, i.e., of the order of 0 to 20 pounds per square inch gauge, the catalyst may be supplied into the contacting zone by means of the gravity feed leg principle, described in United States Patents Numbers 2,410,309 and 2,531,365. This principle is involved in the supply of catalyst into stage 70 of the regenerator in FIGURE 1A, for example. On the other hand, where higher pressures are involved and for low pressure applications also, if desired, a catalyst feed system, such as that shown at 15 in FIGURE 1, may be employed. In this system, it is usually preferred, in order to provide a seal against hydrocarbon escape, to provide a pressure at the upper end of the gravity leg 37 equal to or slightly in excess of that in the catalyst feed section of the reactor. However, in some applications where the seal is not essential, the pressure in chamber 27 of the feed system may be maintained somewhat below that in the reactor feed section, relying upon the gravity feed leg to make up the difference. It is usually preferred, again for seal purposes, to maintain the pressure at the upper end of leg 54 in FIGURE 1A slightly above that in the lower section of the first regenerator stage 58. While mechanical catalyst feeders, such as screw conveyors, may be employed within the broadest aspect of this invention, their use is preferably avoided because of attrition, erosion and mechanical problems which are usually attendant to the use of feed devices of this kind. Moreover, when mechanical feeders are employed in connection with the method of this invention, governors are required to limit the force accompanying and available for catalyst introduction below that which would convey the catalyst through the contacting zone. It will be noted that, in the feed arrangements shown in FIGURE 1A, only a very small amount of seal gas flow accompanies the catalyst flow into the reactor and into regenerator stage 58. In the case of stage 70, there is a small amount of air flow upwardly through the down flowing feed leg 65.

In accordance with the method of this invention, the transfer of the contact material through the contacting zone is effected by means of the separately introduced reactant or contacting fluid. This fluid preferably is introduced into the lower section of the contactor in vaporized condition, for example, as vaporized gas oil feed to the reactor supplied via conduit 42 or as air to the regenerator supplied from conduit 67. However, it is contemplated that the fluid may be supplied in mixed phase, provided that sufficient gaseous or vapor material is formed under the contacting conditions to effect transfer of the catalyst through the contacting zone. In some cases where the catalyst exists at a high temperature within the contacting zone, it is possible to supply the fluid into the contacting zone in totally liquid condition, relying upon gasification of the fluid through cracking conversion or vaporization upon contact with the hot catalyst or both to supply the vapor required to force the catalyst through the contacting zone. The language "contacting fluid, at least part of which exists in the gaseous phase under contacting conditions" is employed herein with the intent of covering any of the above-mentioned alternatives. The terms "gas" or "gaseous" are used herein in a sense sufficiently broad to cover both normally gaseous materials and materials which exist in the gaseous phase under the contacting conditions.

The contacting fluid may be separately introduced into the contacting zone in a number of alternative ways, as will become apparent from the description of FIGURES 2 to 5. Its manner of introduction, to some extent, will depend upon the particular arrangement employed for catalyst introduction. It is usually preferred to supply the gaseous material at a level below or just equal to the level of catalyst supply, although, as shown in FIGURE 2, in some arrangements it may be introduced above the level of catalyst entry. Usually, in the region immediately surrounding the location of fluid introduction, there will exist a region of turbulence in which there is a gas bubble or considerable turbulence. Such regions are shown at 90 and 91 in FIGURES 1 and 1A, for example. In the gas bubble or turbulent region, the catalyst does not exist in compacted condition, and very efficient initial mixing and contacting of the gas and catalyst occurs. The catalyst is pushed by the gas from the mixing region upwardly and, in some instances, laterally into the compact bed which borders the mixing region above. It will be understood that reference herein to the compact bed which is maintained in the contacting zone is not intended to include the mixing region in which a turbulent phase is maintained for initial mixing purposes. The provision of this mixing region is particularly advantageous in operations in which the reactant is introduced in liquid or mixed liquid and vapor phase, since very effective and uniform initial contact between the catalyst and liquid is thereby effected. It is possible, particularly in chambers of relatively large included angle between side walls, to operate essentially without the turbulent mixing region. In either case, the catalyst bed beyond and above the mixing region is maintained in compacted condition throughout.

In accordance with the method of this invention, the density of the contact material bed is within about 95% of the bulk density of the particle form solids, as measured by pouring the solids into a suitable graduate without agitation of the graduate and dividing the weight of the solids by the indicated volume. In other words, the expansion of the bed when the contacting gas is flowing so as to force the contact material to move upwardly through the contacting zone is only of the order of about 5% and not over 10% beyond the volume of the bed in the absence of gas flow. The depth of the bed may vary, depending upon the particular application of the invention and the particular operating conditions for any given process application. In general, bed depths of the order of 2 to 20 feet and preferably 3 to 12 feet are to be employed in commercial scale operations.

While particles of other shapes may be employed in the method of this invention, it has been found that smoother operation, both with respect to solids flow and absence of localized turbulence or gas channeling throughout the compact bed of upwardly moving contact material, is attained when particles of generally spherical shape are employed. In general, spherical particles having average diameters within the range of about 0.03 to 0.5 inch are preferred for use in the method of this invention.

In the arrangement shown in FIGURES 1 and 1A, the rate of catalyst circulation through the entire system is controlled by the rate of catalyst throughput through the lift 13, which is, in turn, controlled by adjustment of the lift gas streams supplied at 17 and 18. One suitable design for accomplishing this control is the subject of claims in United States Patent Number 2,666,731. Under these conditions, the catalyst is maintained in compacted condition in legs 16, 54, 37 and 65, in drain section 51 and in passageways 62 and 73. As a result, the rate of upward catalyst flow through the reactor 50 and regeneration stages 58 and 70 is regulated by the rate at which catalyst can pass from these contacting zones into the respective drain passageways. This, of course, requires a sufficient rate of contacting gas flow to effect at least the desired rate of catalyst transport up through the contacting zones. The weirs 47, 59 and 72 do no act as throttles on the flow in this arrangement. Instead, the flow is throttled by the existing compact mass of catalyst surrounding the weirs in the drain passageways. Since the force of catalyst introduction into the contacting zones is insufficient to transfer the catalyst through the contacting zones, the rate of catalyst entry is automatically controlled by the rate of catalyst overflow from the beds in the contacting zones. Should the catalyst flowing up the lift 13 stop for any reason, catalyst introduction into the contacting zones automatically stops, and no substantial buildup in the surface level of the beds in the contacting zones will occur. In case of catalyst overflow stoppage, the reactant gas simply passes upwardly through the bed and disengages at its surface without substantial build-up in bed level, since the surface velocity of the gas is below the catalyst boiling velocity. By this arrangement, there is provided a certain range of flexibility with respect rate of gas flow through the contacting zone. This range corresponds to the difference between the minimum total gas rate required to effect catalyst flow through the contacting zones at the desired rate and the total gas rate at which the gas velocity exceeds the catalyst boiling velocity at the bed surface in the contacting zones.

An alternative method for controlling rate of catalyst throughput through the contacting zone involves regulation of the rate of contact gas flow. In such operations, the catalyst must be drained from the discharge side of the weirs as fast as it overflows so as not to act as a throttle. This can be done by maintaining the bed level in section 51 of FIGURE 1 or in passages 62 or 73 of FIGURE 1A below the weir level. If the weirs are overdesigned from catalyst passage capacity standpoint, or if, in the arrangement shown in regenerator stages 58 and 70 of FIGURE 1A, the weirs are omitted entirely, the catalyst bed level in the contacting zone will rise with gradual increase in rate of gas flow until the catalyst just overflows from the bed. Any further increase in gas flow will result in catalyst overflow at a higher rate with only a very slight rise in bed surface level. Thus, there is provided within the limits between gas rate causing initial overflow and the gas rate which would boil the catalyst at the bed surface a range in which the rate of catalyst flow can be varied by change in contacting gas flow rate. This provides flexibility with respect space velocity, although not entirely independent of catalyst to oil throughput ratio.

It will be noted that, when the rate of catalyst throughput is controlled by adjustment in the rate of contacting gas throughput by the method last described, a change in space velocity will also occur. (Here, space velocity is defined as volume of contacting fluid throughput measured as a liquid at 60° F. per hour per volume of catalyst or contact material in the contacting zone.) This may be counteracted by providing a cylindrical, rather than tapered, section in the contacting zone at the weir level, as shown in FIGURE 4, and by designing the catalyst weirs so as to act as a more effective throttle on the catalyst overflow from the bed within the anticipated flow range. When this is done, an increase in contacting gas flow beyond that at which the catalyst just starts to flow through the lower portion of the weir will effect increased catalyst flow through the weir only after the surface level of the bed in the contacting zone has increased. The bed level increase tends to counteract the gas rate increase from the standpoint of space velocity.

It will be appreciated, of course, that, where desired, restricting weirs of the type above mentioned may be employed in a section of the vessel which is still expanding. In this case, the rise in bed level accompanying the increase in gas flow results in an increase in bed surface area. This tends to repress increased catalyst flow. In other words, in the case of a continuously expanding bed, increase in the bed surface level means increase in the amount of gas flow required to effect a given rate of catalyst throughput. Since the surface area of the bed increases at successively higher levels, the required higher gas flow rates can be tolerated without disruption of the compact bed.

Data illustrating the above point are presented in Table I. These data were obtained in a contacting zone of frusto-conical shape, having an included angle between its side walls of 60 degrees. Data were taken on catalyst flow rates at different gas flow rates at two different bed depths, as indicated in the table. The catalyst employed was a silica-alumina bead catalyst of 0.08 inch average diameter and 42 pounds per cubic foot bulk density as poured without tapping into a suitable measuring container. The theoretical mass rate of air flow required to boil this catalyst at atmospheric pressure and at a temperature of 60° F. was about 495 pounds per hour per square foot of bed area. The catalyst was supplied to the lower section of the feed zone through a gravity feed leg placed on its lower end, such as is shown at 65 in FIGURE 1A. The contacting fluid was air at 80° F. leaving the bed at atmospheric pressure.

Table I

| Bed Height, 5.2 Inches, Bed Surface Area, 0.54 Sq. Ft. | | Bed Height, 4.7 Inches, Bed Surface Area, 0.40 Sq. Ft. | |
| --- | --- | --- | --- |
| Air Rate, #/hr./ft.$^2$ | Catalyst Rate, kg./min. | Air Rate, #/hr./ft.$^2$ | Catalyst Rate, kg./min. |
| 266 | 0 | 320 | 0 |
| 300 | 1.04 | 370 | 0.75 |
| 320 | 2.16 | 390 | 1.58 |
| 340 | 3.21 | 400 | 2.73 |
| -------- | -------- | 420 | 4.94 |
| -------- | -------- | 430 | 7.40 |
| -------- | -------- | 460 | Bed Disruption |

An arrangement permitting selective adjustment in the level of the bed surface and of catalyst withdrawal, either for the purpose of effecting a change in space velocity or a change in catalyst throughput rate, is shown in FIGURE 2. In FIGURE 2, the same reference numerals as in FIGURE 1 are employed for similar elements, except where otherwise specifically discussed. In FIGURE 2, the contacting vessel 100 is again of frusto-conical shape and is provided with rectangular overflow weirs 101 and a surrounding catalyst withdrawal chamber 102. A contact material withdrawal conduit 103 provided with flow throttling valve 104 is connected into the bottom of chamber 102. A number of contact material withdrawal conduits, of which two, 105 and 106, are shown, extend upwardly through the bottom of vessel 100 and terminate therein at points uniformly distributed with respect the vessel cross-section at a level somewhat lower in the vessel than slot weirs 101. It will be understood that contact material withdrawal conduits may also be provided to discharge contact material from other levels in the contacting zone if desired. In this arrangement, assuming a sufficient rate of contacting gas flow to effect the desired contact material flow, the rate of contact material flow may be controlled by means of throttle valve 104 when the upper draw-off level is employed or by valves 107 and 108 when it is desired to maintain the bed surface at the lower level.

In the system of FIGURE 2, contact material is forced by means of gaseous pressure from the pressure feed pot 109 through conduit 110 so that it is introduced upwardly into the lower section of the contacting zone 100. The contact material may be supplied into pressure feed pot 109 through conduit 111 from a system such as is represented by chambers 21 and 25 of FIGURE 1, in which event feed pot 109 is the equivalent of chamber 27 of FIGURE 1. On the other hand, several feed pots may be employed on a batch cycle basis, the feed pots being closed off from the contacting zone and depressured in order to refill with contact material. In operation, a suitable transport gas, which may be a gas inert to the contacting gas and contact material involved in the zone 100 or which may be a portion of the contacting gas, is supplied to pot 109 through conduit 112 at a rate controlled by valve 113. Some of the gas seeps down through the compact bed maintained in pot 109 and through the compact column of contact material in conduit 110 so as to enter the zone 100 along with the contact material. The amount of gas entering the zone 100 along with the contact material is small relative to the contact gas stream which is separately introduced from conduit 114 via nozzles 115. The reason for this rests in the fact that the pressure maintained in the feed pot 109 is controlled by valve 113 only slightly in excess of that required to effect the contact material introduction into zone 100 and that the column of contact material in conduit 110, which is of restricted area relative to that of the contacting zone, acts as a seal against extensive gas flow from pot 109. While the gas entering through conduit 110 may join the gas entering from conduit 114 in forcing the contact material to move upwardly through zone 100, it is, of itself, insufficient in quantity to effect transfer of the contact material upwardly through zone 100.

It is possible, in an arrangement of the type disclosed in FIGURE 2 and by other arrangements, to vary the rate of contact material throughput without essential change in the rate of contacting gas flow. For example, if the weirs 47 are over-designed and contact material withdrawn near conduit 104 at a rate sufficient to maintain the bed level in drain chamber 102 below the weirs, and if the rate of contacting gas throughput is sufficient to provide the maximum desired contact material flow rate, then the rate of contact material throughput through zone 100 can be controlled by simply regulating the rate of contact material supply by means of the pressure regulating valve 113 on the feed pot gas conduit 112. Under these conditions, if the contact material supply were suddenly stopped altogether, the flow through weirs 47 would stop, and the contacting gas would merely pass up through the compact bed in zone 100 without disruption of the bed and without net transfer of the contact material through zone 100 until its introduction through conduit 110 is resumed. Once the rate of contact material flow has been set to provide the desired rate of contact material flow, it is possible to vary the rate of contacting gas flow independently of contact material throughput within a certain range. This range is defined on the lower end by the minimum rate of contacting gas flow required to force the contact material up through the contacting zone at the desired throughput rate and on the upper end by the rate of gas flow which would cause boiling of the contact material bed at its surface.

It has been found that, by provision of baffles or grating to subdivide the bed near its surface into a plurality of vertically extending side by side elections, somewhat higher rates of gas flow may be tolerated without disruption of the bed. Baffling suitable for this purpose is shown in the form of the subway grating 116 extending across the vessel 100 shortly above the level of the weirs 47. By use of such grids, gas rates at the bed surface up to 100%, and in some instances 130%, of the contact material gravity head (i.e., of the bed boiling velocity) have been attained without disruption of the compact bed in the contacting zone. It is preferred, however, when using such baffles or grating, to limit the gas flow to a rate not in excess of and preferably 1 or 2% below what would be the bed boiling velocity in the absence of the grating. The restraining baffles should be designed to provide substantial increase in hydraulic radius, i.e., bed cross-sectional area at surface divided by perimeter of metal surface in contact with the contact material, without substantial decrease in area available for upward gas flow. In general, the hydraulic radius in the section in which the restraining baffles are located should be less than about 2 inches. However, the minimum lateral dimension in the grid openings should be at least five times the largest contact material particle diameter and preferably should be at least ¾ inch. The vertical length of the passageway provided by the baffles may be of the order of ½ inch to 10 inches.

Turning now to FIGURE 3, there is shown a modified arrangement suitable for application of this invention to a continuous cyclic catalytic conversion process. Similar elements are indicated by the same reference numerals in FIGURES 1, 1A and 3 except where specifically otherwise discussed. Assuming again that the method is applied to a process for catalytic cracking of petroleum fractions boiling above gasoline to provide gasoline-containing products, it will be noted that the reaction and regeneration zones are housed side by side in the same vessel 130 in this arrangement. Thus, the reaction zone is that enclosed by a plurality of mushroom-shaped receptacles, of which two, 131 and 132, are visible in FIGURE 3. It will be noted that the confining walls of zones 131 and 132 flare out along a spiral and are provided with serrations 133 around their upper edges. Catalyst is continuously supplied upwardly into zones 131 and 132 through conduits 134 and 135, respectively, by means of a pressuring gas such as steam introduced into chamber 27 at a rate controlled by flow control valve 35 on conduit 34. Valve 35 may be regulated by flow controller 170, which may be set to provide any desired pressure in chamber 27. The remainder of the catalyst feed system is similar to catalyst feed system 15 of FIGURE 1. Vaporized or mixed vapor and liquid gas oil feed enters the reactor chambers through conduits 136 and 137, and gasoline-containing vapor products are withdrawn from the top of vessel 130 via conduit 40. If desired, liquid feed may be separately introduced into the conversion zones from manifold 138 via conduits 139 and 140. A suitable seal and purge gas, such as steam or flue gas, is introduced from manifold 141 via pipes 142 under the distributor troughs 143, from which it flows in part upwardly through the catalyst bed and out with the vapor products via conduit 40. The pressure at the level of purge gas introduction is maintained somewhat above that in the top of vessel 130 by means of valve 144 and differential pressure controller 145 so as to provide a seal between the reaction zone and the regeneration zone therebelow. Catalyst overflowing from the reaction zones through weirs 133 flows downwardly as a compact bed of gravitating particles first through the purge and seal region above described and then through the regeneration zone, which is comprised of the region within vessel 130 surrounding the reaction zone housings 131 and 132 and between the rows of flue gas collector troughs 150 and 151. Air is introduced into the regeneration zone from manifold 152 via pipes 153, which deliver the air under distributor troughs 154. The air stream splits, part passing up through the catalyst bed to collector troughs 150 and part passing down through the bed to collector troughs 151. The flue gas is withdrawn through manifolds 165 and 166 to duct 167. Part of the seal steam from troughs 143 passes down through the bed and is withdrawn from the bed along with flue gas collected under troughs 150. The amount of this flow may be suitably limited by control of the kiln back pressure by means of throttle means 168 and 169 and flue gas outlet manifolds 165 and 166. Heat liberated by combustion of the coke deposited on the catalyst is absorbed by the catalyst, which may be circulated at a sufficiently high rate to limit the amount of coke deposit below that which would, upon burning, overheat the catalyst during its passage through the regeneration zone. A portion of the heat released by coke combustion passes through the walls of housings 131 and 132 so as to become available for the endothermic cracking reaction. It will be understood that suitably located cooling coils may be provided within or below the regeneration zone for heat extraction and catalyst temperature adjustment purposes if necessary. Regenerated catalyst passes downwardly through openings 160 in partition 161 and then through suitable partition and orifice arrangements 162 and 163 to promote uniform withdrawal to outlet conduit 164. The catalyst is then recirculated to the reaction zone by means of the catalyst feed system 15.

It will be noted that, in the method of operation depicted by FIGURE 3, advantage is taken of the upward travel of the catalyst through the reaction zone to accomplish thereby the major portion of the catalyst elevation required to effect cyclic circulation of the catalyst. The vertical distance through which the catalyst need be lifted to effect its transfer from the bottom of the regeneration zone to the bottom of the reaction zone obviously can be very small, the main function of the catalyst feed system 15 being to overcome the pressure differential between the reaction and regeneration zones.

In order to improve the uniformity of upward contact material flow through the contacting zones, baffle arrangements may be provided therein. One such baffle arrangement is shown in FIGURE 4. In FIGURE 4, gradual expansion of the bed cross-sectional area at successively higher levels in the contacting vessel 185 is accomplished by forcing it to move upwardly through a contacting zone 185 formed by joining together a number of cylindrical sections 186 to 191 inclusive, which are of progressively greater diameter at successively higher levels. Openings 193 are spaced around the section 191 to permit out-flow of contact material without throttle onto bed 194 in the drain chamber 195. A number of contact material drain conduits 197 connect into the bottom of chamber 195. In the section of the vessel opposite the openings 193, there are supported by suitable beams, of which one, 198, can be seen, a number of concentric, open-ended, cylindrical baffle sections 200, 201 and 202. It will be noted that each successive cylindrical section of increasing diameter is of decreasing height. It will be noted that, in the absence of the cylindrical baffles, the straight line distance for contact material flow from the lower section of the bed to its surface in vessel 185 increases slightly at increasing distances outward from the vertical axis of the bed. While, in very long beds, this factor does not seriously affect the uniformity of contact material flow in various portions of the bed, there may arise in relatively short beds a tendency for greater flow through the central portions than through the outer portions. This tendency may be counteracted by proper selection of the heights of the cylindrical baffle sections 200, 201 and 202. In normal operation, the velocity of gas flow will decrease to a level below the contact material bed boiling velocity as it passes up from that portion of the bed within section 190 to that portion within section 191.

In the arrangement shown in FIGURE 4, the contact material is introduced from conduit 205. Contacting gas is separately introduced from conduit 206 into manifold 207, from which it passes via openings 208 and 209 under the downwardly sloping distribution rings 210 and 211, respectively, and then out into the contacting zone.

Turning to FIGURE 5, there is shown a modified multistage application of the method of this invention. Similar elements in FIGURES 1 and 5 bear the same reference numerals except where otherwise specifically stated. In FIGURE 5, there are shown three superimposed contacting stages 220, 221 and 222 within the housing 223. The total contact material supply is introduced through gravity feed leg 224 into the lower section of the uppermost contacting stage 220. A portion of the total supply passes down through gravity feed leg 226 to stage 221, and a portion of that supplied to stage 221 passes via gravity feed leg 227 to stage 222. In this arrangement, the length of the gravity feed legs through which contact material is supplied each stage must be sufficient to force the contact material to flow by gravity against the pressure differential existing between the upper and lower ends of the legs. Since the vapor flow is parallel through the several stages, the pressure differential across legs 226 and 227 will be small. Reactant fluid is supplied from conduit 230 and manifold 231 via conduits 232, 233 and 234 to stages 220, 221 and 222, respectively. It will be noted that the fluid enters stage 220 from a manifold jacket 235 via openings 236, which are shielded from contact material by perforated covers 237. A similar arrangement is provided for reactant distribution into stage 221. In the case of stage 222, the inlet conduit 234 extends into the bottom of the stage, and the fluid is distributed therefrom through the T-nozzle 238. Contacted vapors are withdrawn from the stages 220, 221 and 222 via conduits 240, 241 and 242, respectively, which connect into outlet manifold 243. The rate of contact material flowing upwardly through each stage may be controlled by adjustment in the rate of reactant fluid flow. This automatically controls the split in each stage between the portion of the total contact material supplied thereto which passes up through that stage and the portion which by-passes down to the stage next below.

Skirts 245 depend from the upper edge of the contacting stages to provide a passageway 246 for free fall of the used contact material from the several stages down onto a common accumulation bed 247 located below the lowermost contacting stage. Contact material is withdrawn through partition and orifice arrangements 52 and 53 to the outlet conduit 248. It will be seen that this arrangement permits parallel flow of both reactant fluid and contact material through the several contacting stages. This application of the invention is particularly useful for catalytic hydrocarbon conversion reactions, such as catalytic cracking, when high catalyst to oil throughput ratio operation is desired.

As a further example of operation in accordance with this invention, a contacting zone was constructed and operated which was generally similar to reactor 10 in FIGURE 1. The contacting zone was of frusto-conical shape, having an included angle of 45 degrees between its side walls. Slot-type weirs were provided which extended along a substantial portion of the side wall height. Means were provided to permit closure of the lower portions of the weirs so that the bed level in the contacting zone could be adjusted by adjusting the effective draw-off level of the slot weirs. Atmospheric air at room temperature was employed as the contacting gas, and the contact material consisted of dried beads of silica-alumina hydrogel suitable as a catalyst or, in this instance, as a desiccant. The beads were of 0.08 inch average diameter and 42 pounds per cubic foot loose bulk density. The theoretical boiling mass velocity for the beads under these conditions was about 495 pounds per hour per square foot of bed surface area. Atmospheric pressure was maintained at the bed surface and the pressure in the gas supply region at the bottom of the contacting zone ranged from 7 to 30 inches of water, depending upon the gas velocity and selected bed depth. The contact material was supplied through a gravity feed leg of 28 mm. internal diameter flared on its lower end to 1¾ inch at its bottom. Contact material throughput rates attained for various air flow rates and for two different bed depths are indicated in Table II below.

*Table II*

| Bed Height, 3.5 Inches Bed Surface Area, 0.28 Sq. Ft. | | Bed Height, 5.8 Inches Bed Surface Area, 0.54 Sq. Ft. | |
|---|---|---|---|
| Air Rate | Contact Material Rate, #/Hr./Sq.[1] | Air Rate | Contact Material Rate, #/Hr./Sq.[1] |
| S.c.f.m. — #/Hr./Sq.[1] | | S.c.f.m. — #/Hr./Sq.[1] | |
| 26 — 430 | 0 | 39.5 — 340 | 0 |
| 28 — 465 | 550 | 41.5 — 355 | 100 |
| 30.5 — 510 | 2,820 | 45 — 390 | 550 |
| 33 — 550 | [1] 3,400 | 48 — 410 | 1,060 |
| 39 — 645 | —— | 50 — 430 | [1] 1,650 |
| | | 51 — 440 | —— |

[1] Bed disruption.

In Table II, the rate of total air passage through the contact material bed is given in standard cubic feet per minute and in pounds per hour per square foot of horizontal cross-sectional area at the bed surface. The total rate of contact material throughput is given in pounds per hour per square foot of horizontal cross-sectional area at the bed surface. The asterisks opposite the last listed flow rate in each column indicate that the maximum contact material throughput rate was limited at that point by the gravity feed leg capacity.

It is intended to cover all changes and modifications of the examples of the operation and application of this invention herein chosen for purposes of the disclosure which do not constitute departures from the spirit and scope of the invention.

We claim:

1. The method for contacting a fluid, at least part of which exists in the gaseous phase under the contacting conditions, and a solid contact material of palpable particulate form which comprises introducing said contact material into the lower section of an expanded contacting zone through at least one inlet opening with a force insufficient to move the contact material upwardly through said zone, separately introducing said fluid into the lower section of said zone so as to mix with said contact material, controlling the rate of fluid introduction to provide an upward flow of gaseous material through the contacting zone sufficient when added to the force of contact material introduction to push the contact material upwardly through said zone as a substantially compact bed, expanding said bed laterally at least along an upper portion thereof to effect reduction in the upward velocity of gaseous material flow by the time it reaches the surface of said bed below that which would cause substantial boiling of the bed at its surface, whereby the bed is maintained in compacted condition substantially throughout its length, withdrawing the contact material from said zone near the upper end of said bed and separately withdrawing the contacted gaseous material upwardly from said bed, said zone having a cross-sectional area at the region of mixing of the separately introduced fluid and said contact material substantially greater than the total cross-section of said opening for contact material introduction and having a cross-section for flow at least as great as that at said region of mixing at all locations intermediate the same and the location for upward withdrawal of contacted gaseous material from said bed.

2. The method for contacting a fluid, which exists at least partially in the gaseous phase under the contacting conditions, with a solid contact material of palpable particulate form which comprises maintaining a substantially compact bed of said contact material in a contacting zone, introducing said fluid into the lower section of said zone and passing it upwardly through said bed at a rate sufficient to force the contact material in said bed to move upwardly through said zone, the bed being of progressively increasing horizontal cross-section at successively higher levels at least along the upper portion thereof until its horizontal cross-section is large enough to reduce the velocity of upward flow of the fluid below that which would cause substantial boiling of the bed near its surface, whereby the bed is maintained in compacted condition throughout its length above the region of introduction of said fluid, withdrawing contacted gaseous material and the contact material from the upper section of said bed, introducing a stream of contact material through at least one confined passage into the lower section of said zone separately of the aforementioned fluid introduction so as to replenish said bed, said contact material being introduced with a force insufficient to convey the contact material upwardly through said bed, the cross-sectional area of said zone at the location of fluid introduction being substantially greater than the total cross-section for flow along at least a substantial portion of the length of the passage for separate contact material introduction and the cross-section for flow in said zone being at least as great as that at said location of fluid introduction at all locations intermediate the same and said location of gaseous material withdrawal from the upper section of said bed.

3. The method of claim 2 characterized in that the rate of contact material flow through said contacting zone is regulated by controlling the rate of contact material withdrawal from the upper section of said bed, the force of contact material introduction into the lower section of said bed being maintained sufficient to insure replenishment of said bed by contact material introduced but insufficient to cause substantial build-up in the surface level of the bed upon reduction in the rate of contact material withdrawal from the bed.

4. The method of claim 2 characterized by the step of subdividing an upper section of said bed into a plurality of latterally confined, vertically unobstructed units so as to effect, through decrease in hydraulic radius, a substantial added resistance to upward movement of the contact material but only a relatively minor added increase in resistance to upward gas flow.

5. The method of claim 2 characterized in that the bed surface level is maintained substantially constant, and the rate of contact material flow through the contacting zone is regulated by adjustment and control of the rate of upward flow of said fluid through the bed.

6. The method for contacting a fluid, at least part of which exists in the gaseous phase under the contacting conditions, with a solid contact material of palpable particulate form which comprises maintaining a vertical series of substantially compact, upwardly extending beds of said contact material, introducing contacting fluid into the lower section of each bed and passing it upwardly therethrough at a rate sufficient to force the contact material to move upwardly in the bed in substantially compacted condition, each bed being of progressively increasing horizontal cross-section at successively higher levels at least along the upper portion thereof until its horizontal cross-sectional area is sufficient to reduce the velocity of upward fluid flow below that which would substantially boil the bed near its surface and disrupt its compacted condition, withdrawing contacted gaseous material upwardly from each bed and separately withdrawing the contact material from the upper section of each bed and gravitating the contact material withdrawn from each bed onto an accumulation thereof maintained therebelow in a confined drain zone, separately supplying contact material as a confined compact stream into a region communicating the lower section of the uppermost bed with a force insufficient to push the contact material upwardly therethrough, said stream being of substantially less cross-sectional area than that of said uppermost bed at the location of said fluid introduction thereinto and the cross-section of said bed being at least as great as that at said location of fluid introduction at all levels therein above the same, and flowing contact material from the uppermost bed and each bed therebelow, excepting the lowermost bed, as a compact confined stream to a region communicating the bed next below.

7. The method for contacting a fluid, which exists at least partially in the gaseous phase under the contacting conditions, with a solid contact material of palpable particulate form, which method comprises maintaining a substantially compact bed of said contact material in a contacting zone, said bed being of progressively greater horizontal cross-sectional area at successively higher levels, introducing contact material into the lower section of said zone as at least one compact confined stream of substantially less total cross-sectional area than said bed with a force insufficient to convey the contact material upwardly through said zone, separately introducing said fluid into the lower section of said zone to mix with said contact material and passing it upwardly through said bed at a rate sufficient to create, due to its flow, a pressure drop in pounds per square foot per foot of upward flow through most of the bed depth sufficiently in excess of the gravity head of the compacted contact material through the same bed depth to force the contact material in said bed to move upwardly through said zone, maintaining the upward rate of fluid flow through the uppermost portion of the bed below that at which the pressure drop per increment of upward flow path in the portion of the bed immediately adjacent the bed surface would equal the gravity head of the compacted contact material in the same increment, whereby the bed is maintained in compacted condition, withdrawing the fluid in gaseous phase upwardly from said bed and separately withdrawing contact material from the upper section of said bed, the cross-sectional area for flow at all locations in said bed intermediate the region of mixing of separately introduced fluid and said contact material and the location of fluid withdrawal from the upper section of said bed being at least as great as that at said region of mixing.

8. The method of claim 7 characterized in that said contact material is made up essentially of spheroidal particles falling in the size range 0.03 to 0.5 inch particle diameter and said bed tapers outwardly continuously along at least two opposite upwardly extending boundaries, the included angle between projected tangents drawn to said boundaries at any level between the levels of fluid introduction into and withdrawal from said bed falling in the range of about 20 to 100 degrees.

9. The method of claim 7 characterized by the further step of controlling the rate of contact material flow through said contacting zone by selectively controlling the level of contact material withdrawal from the upper section of the bed, thereby selectively adjusting the surface level of said bed in the contacting zone and adjusting the rate of fluid introduction into said zone to maintain the velocity of upward fluid flow through said bed as set forth in claim 7.

10. The method for effecting conversion of a fluid reactant, which exists at least partially in the gaseous phase under the conversion conditions, in the presence of a suitable catalyst of palpable particulate form, which comprises maintaining a substantially compact bed of said catalyst under suitable conversion conditions of temperature and pressure in a confined, upwardly extending conversion zone, said bed being of progressively greater horizontal cross-sectional area at successively higher levels, introducing catalyst into the lower section of said zone as at least one confined, compact stream of substantially less total cross-section than said bed with a force insufficient in itself to effect transfer of the catalyst through the conversion zone, separately introducing the fluid reactant into the lower section of said conversion zone so as to provide an upward flow of gaseous reactant through said bed sufficient to crease a pressure drop due to its flow through most of the height of said bed in excess of the gravity head of the compacted catalyst through the same height and to cause the catalyst to move upwardly through said zone, but controlling the rate of reactant flow below that which would create a pressure drop due to its flow through the portion of the bed immediately below its surface equal to the gravity head of said catalyst through the same bed portion whereby the bed is maintained in compacted condition, withdrawing gaseous conversion products upwardly from said bed and separately withdrawing the catalyst from the upper section of said bed, the cross-sectional area for flow at all locations in said bed intermediate the location of separate fluid reactant introduction thereinto and the location of gaseous conversion product therefrom being at least as great as that at said location of separate fluid reactant introduction.

11. The method of claim 10 characterized in that said bed is of continuously expanding cross-section at successively higher levels with the slope of the expansion falling in the range 60 to 75 degrees and said catalyst is made up essentially of spheroidal particles falling in the size range 0.03 to 0.5 inch diameter.

12. The method of claim 10 characterized in that the catalyst is forced into said zone by means of a pressurized stream of gaseous material comprising a portion of the fluid reactant insufficient in amount to convey the catalyst upwardly through the conversion zone.

13. The method of contacting a fluid material with a solid contact material of palpable particulate form which comprises introducing the contact material into the lower section of an upwardly extending contacting zone and causing it to pass upwardly therethrough as a substantially compact bed of progressively larger horizontal cross-sectional area at successively higher levels, the contact material being introduced into said zone against a gaseous pressure therein from the lower end of an upwardly extending, substantially compact, confined feed leg of gravitating contact material, said leg being of substantially less horizontal cross-section than said bed at the level of contact material entry into the bed and being of sufficient height to force the contact material into said bed but of insufficient height to push the contact material upwardly through said contacting zone, separately introducing said fluid into the lower section of said zone so as to provide an upward flow of said fluid in gaseous phase through said bed sufficient to create a pressure drop due to its flow through most of the height of said bed in excess of the gravity head of the compacted contact material through the same height and to cause the contact material to move upwardly through said zone as aforesaid, but controlling the rate of fluid flow below that which would create a pressure drop due to the flow of gaseous fluid through the portion of the bed immediately below its surface equal to the gravity head of said contact material through the same bed portion, whereby the bed is maintained in compacted condition, withdrawing the gaseous fluid upwardly from said bed and separately withdrawing the contact material from the upper section of the bed, the cross-sectional area of said zone at the location of separate introduction of said fluid being substantially greater than that of said feed leg and the cross-section for flow at all locations in said bed intermediate said location of fluid introduction and the location of upward fluid withdrawal from said bed being at least as great as that at said location of fluid introduction.

14. The method of claim 13 characterized by the step of subdividing an upper section of said bed into a plurality of laterally confined, unobstructed units whereby the hydraulic radius of the bed is substantially reduced near its surface, and further characterized in that the rate of contact material flow through said zone is limited by the rate of contact material withdrawal from said bed and the gravity feed leg is of sufficient height to force contact material into said bed to replace contact material withdrawn from the upper section thereof but of insufficient height to cause a substantial build-up in the bed surface level upon a reduction in the rate of contact material withdrawal from the bed.

15. The method for contacting a fluid, which will be at least partially in the gaseous phase under the contacting conditions, with a solid contact material of palpable particulate form, which comprises introducing the contact material into the lower section of an upwardly extending contacting zone through at least one inlet opening and causing it to pass upwardly therethrough as a substantially compact bed, the contact material being introduced with a force which is in itself insufficient to effect transfer of the contact material upwardly through said contacting zone, separately introducing said fluid into the lower section of said zone and passing it first through a region in which turbulent mixing of the contact material and fluid occurs due to the high mass velocity of fluid flow and then upwardly through the portion of said zone in which the contact material is in compact bed condition at a rate sufficient to push the contact material upwardly through said zone, laterally expanding said bed at successively higher levels to increase its horizontal cross-sectional area until a level is reached near the bed surface at which the upward gas velocity is below the boiling velocity of the contact material, whereby the bed below is maintained in compacted condition, and withdrawing the fluid and contact material from the upper section of said bed, the cross-section for flow in said zone at said region of mixing of contact material and said fluid being substantially greater than the total area of inlet opening for said contact material and the cross-section for flow at all locations in said zone intermediate said location of mixing and said location for fluid withdrawal from said bed being at least as great as that at said location of mixing.

References Cited in the file of this patent

UNITED STATES PATENTS

| | | |
|---|---|---|
| 2,684,390 | Bills | July 20, 1954 |
| 2,684,867 | Berg | July 27, 1954 |
| 2,684,872 | Berg | July 27, 1954 |
| 2,684,873 | Berg | July 27, 1954 |
| 2,703,732 | Schutte | Mar. 8, 1955 |
| 2,799,095 | May | July 16, 1957 |
| 2,804,368 | Summers | Aug. 27, 1957 |

FOREIGN PATENTS

| | | |
|---|---|---|
| 578,323 | Great Britain | June 24, 1946 |
| 600,326 | Great Britain | Apr. 6, 1948 |

UNITED STATES PATENT OFFICE
CERTIFICATION OF CORRECTION

Patent No. 3,002,805                      October 3, 1961

Lewis M. Browning, Jr., et al.

It is hereby certified that error appears in the above numbered patent requiring correction and that the said Letters Patent should read as corrected below.

Column 13, line 2, for "elections" read -- sections --; column 16, Table II, column 3, line 4 thereof, for "13,400" read -- *3,400 --; same Table II, column 6, line 5 thereof, for "11,650" read -- *1,650 --; same Table II, footnote at bottom of table, for "1Bed disruption." read -- *Bed disruption. --; column 19, line 5, for "crease" read -- create --.

Signed and sealed this 10th day of April 1962.

(SEAL)
Attest:

ERNEST W. SWIDER
Attesting Officer

DAVID L. LADD
Commissioner of Patents